United States Patent
Kashihara (10) Patent No.: US 7,193,744 B2
(45) Date of Patent: Mar. 20, 2007

(54) IMAGE FORMING SYSTEM AND ITS CONTROL METHOD

(75) Inventor: Atsushi Kashihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 09/768,330

(22) Filed: Jan. 25, 2001

(65) Prior Publication Data

US 2002/0018223 A1    Feb. 14, 2002

(30) Foreign Application Priority Data

Jan. 31, 2000   (JP)   ............... 2000-022100
Jan. 31, 2000   (JP)   ............... 2000-022101

(51) Int. Cl.
  *G06F 15/00*   (2006.01)
  *G06K 1/00*    (2006.01)
  *H04N 1/60*    (2006.01)

(52) U.S. Cl. ............ 358/1.9; 358/1.2; 358/1.9; 358/3.28; 713/176; 399/166; 399/266; 399/366; 283/72; 283/73; 283/74

(58) Field of Classification Search ........ 399/366, 399/266, 166; 283/902; 382/135
See application file for complete search history.

(56) References Cited

U.S. PATENT DOCUMENTS

| | | | | |
|---|---|---|---|---|
| 5,216,724 A | * | 6/1993 | Suzuki et al. | 382/135 |
| 5,533,144 A | * | 7/1996 | Fan | 382/135 |
| 6,144,835 A | * | 11/2000 | Inoue et al. | 399/366 |
| 6,285,776 B1 | * | 9/2001 | Rhoads | 382/100 |
| 6,317,524 B1 | * | 11/2001 | Wu et al. | 382/298 |
| 6,765,688 B1 | * | 7/2004 | Claiborne | 358/1.18 |

FOREIGN PATENT DOCUMENTS

| | | |
|---|---|---|
| JP | 01-285977 | 11/1989 |
| JP | 06-113134 | 4/1994 |
| JP | 07-250242 | 9/1995 |
| JP | 09-305075 | 11/1997 |
| JP | 11-088564 | 3/1999 |
| JP | 11-088666 | 3/1999 |
| JP | 11-261811 | 9/1999 |
| JP | 11-266364 | 9/1999 |

* cited by examiner

Primary Examiner—King Y. Poon
Assistant Examiner—Yixing Qin
(74) Attorney, Agent, or Firm—Fitzpatrick, Cella, Harper & Scinto

(57) ABSTRACT

Conventionally, when counterfeit judgment processing by using electronic watermark is performed in a printer driver, a printing speed is lowered due to heavy load. To solve the problem, in the printer driver, first, it is judged whether or not image data indicated by input print information is in high quality. If the image data is in high quality, it is judged whether or not the image data represents a particular image. If the image data represents the particular image, predetermined processing is performed on the image data. This minimizes the execution of counterfeit judgment processing and reduces the load.

18 Claims, 9 Drawing Sheets

!WARNING : THIS DATA INCLUDES IMAGE OF
WHICH DUPLICATION IS LEGALLY
PROHIBITED.

IS THIS DATA PRINTED?

| YES | NO |

IMAGE FORMING SYSTEM AND ITS CONTROL METHOD

FIELD OF THE INVENTION

The present invention relates to an image forming system and its control method, and more particularly, to an image forming system and its control method for forming an image based on image data with fidelity on a print medium.

BACKGROUND OF THE INVENTION

In recent years, in accordance with improvement in performance of color image reading devices (scanners) and color printers, there is an increasing risk of counterfeiting a particular original such as a bank note or a negotiable instrument by reading the original from a color scanner and outputting the read image data to a color printer.

To prevent the counterfeiting, color copying machines, having a construction as a combination of color scanner and color printer, often incorporate a counterfeit prevention device which discriminates whether or not an original to be processed is such particular original and performs duplication prohibition processing.

However, the counterfeit prevention device used in the above color copying machines operate only in duplication processing. Accordingly, in a system where a scanner is connected to a printer via a host computer, there is a possibility that a counterfeit can be obtained by once reading a duplication-prohibited original by the scanner or the like then storing the read image data, and outputting the stored image data by the color printer. Further, generally, the above conventional counterfeit prevention device is expensive, therefore it is difficult to incorporate the device into small and low-price color copying machines and printers.

On the other hand, a so-called electronic watermark technique of embedding copyright information or the like in digital contents of image or music, is being practically used, and the application of electronic watermark technique to the above-described counterfeit preventing device is proposed. For example, counterfeiting can be prevented by embedding information processed by the electronic watermark technique in a duplication-prohibited printed matter (particular original), and detecting the electronic watermark information upon duplication or printing of the printed matter.

However, in a case where counterfeit judgment processing based on the above-described electronic watermark is executed in a printer driver in a host computer, heavy load is posed on the CPU. Accordingly, the printing speed in the system or apparatus is seriously reduced by execution of the counterfeit judgment processing.

SUMMARY OF THE INVENTION

The present invention has been proposed to solve the conventional problems, and has its object to provide an image forming apparatus and its control method which realize high speed printing by reducing load of counterfeit judgment processing in a printer driver.

According to the present invention, the foregoing object is attained by providing a control method for an image forming system where an image processing apparatus for generating image data is connected to an image forming apparatus for forming a visible image based on the image data on a print medium, in the image processing apparatus, the method comprising: an input step of inputting print information; an object image judgment step of judging whether or not image data indicated by the print information inputted at the input step is in high quality; a particular image judgment step of, if it is judged at the object image judgment step that the image data is in high quality, judging whether or not the image data represents a particular image; and a particular image processing step of, if it is judged at the particular image judgment step that the image represents the particular image, performing predetermined processing.

In accordance with the present invention as described above, by performing particular image judgment processing, i.e., counterfeit judgment processing, only on a high-quality image, the load is reduced and high-speed printing can be performed.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
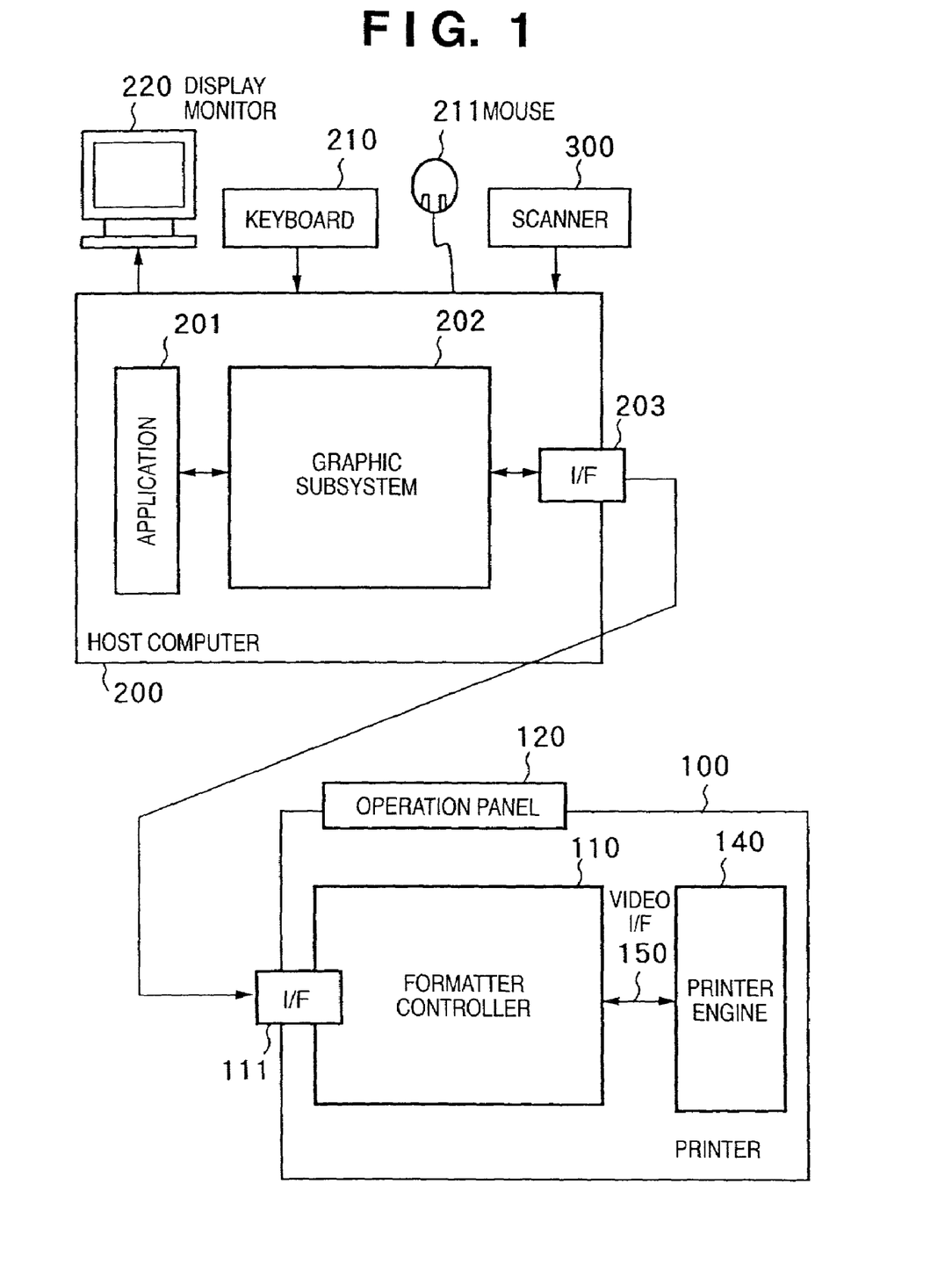
FIG. 1 a block diagram showing the configuration of printing system according to a first embodiment of the present invention.

FIG. 1 is a block diagram showing the configuration of printing system using a color laserbeam printer to which a first embodiment of the present invention is applied.

In FIG. 1, reference numeral 200 denotes a host computer which outputs print information including print data and control code via an interface (I/F) 203 to a printer 100. The host computer 200 is a computer system having a keyboard 210 as an input device, a mouse 211 as a pointing device and a display monitor 220 as a display device. Further, when a scanner 300 is connected to the host computer, image data obtained by optically reading an original image from the scanner 300 can be inputted into the host computer. The host computer 200 operates by a basic OS such as Windows NT and Windows 95(98) (trademarks by Microsoft Corporation).

On the host computer 200 side, the functions on the basic OS regarding the present embodiment are briefly classified into application software 201 and a graphic subsystem 202.

The application software 201 is, e.g., application software which operates on basic software such as a word processing program or a spreadsheet program.

Figure 2:
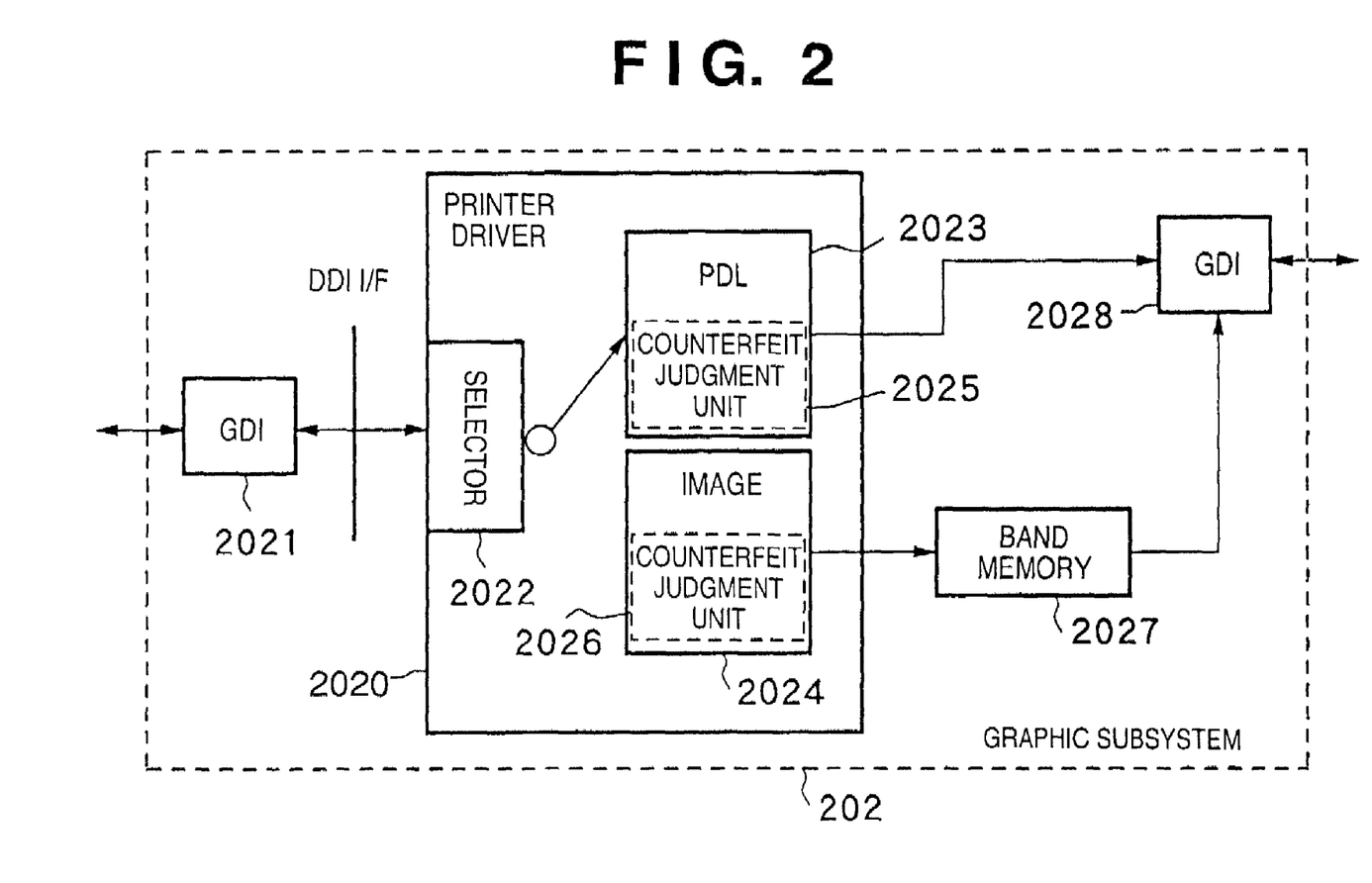
FIG. 2 is a block diagram showing the construction of graphic subsystem.

As shown in FIG. 2, the graphic subsystem 202 has a graphic device interface (hereinafter GDI) 2021 as a part of the functions of the basic OS and a printer driver 2020 as a device driver dynamically linked from the GDI 2021.

The printer driver 2020 is called from the GDI 2021 via a Device Driver Interface (DDI), and performs processing in accordance with a device upon each drawing object. The processing system of the printer driver 2020 divides into a PDL mode type 2023 and a image mode type 2024, and one of them is selected in correspondence with input data.

The PDL mode type is provided for a printer having a controller capable of processing a control command called PDL (Page Description Language). As soon as the printer driver 2020 converts the print information forwarded via the DDI into a PDL command, it transmits the command via the GDI 2028 to the printer 100.

As the processing by the printer driver 2020 in the PDL mode type is merely generating a command from the data from the DDI, it can be considered that this processing is light-loaded processing for the driver.

The feature of the PDL mode type is that if the printer 100 has high performance to interpret the PDL command, the printer driver 202 can receive data with high degree of extraction from the GDI 2021 and send the data to the printer 100, therefore, in normal page printing, the data size to be transferred can be small regardless of resolution and output tonality.

However, in the PDL mode type, in drawing gradation-processed figure or the like by graphic application software or outputting high-resolution/high tonality image, a large print command is generated, therefore, the processing speed is often extremely lowered.

On the other hand, in the image mode type, a print image is mapped on memory space ensured on the printer driver 2020 side, to avoid high-level drawing processing on the printer 100 side, and the print image is converted into data which can be directly printed by the printer 100, then sent to the printer 100.

As the processing by the printer driver 2020 in the image mode type, the image mode printer driver 2024 performs drawing processing, using print information inputted via the DDI from the GDI 2021 as in the case of the PDL mode type, on a band memory 2027, and transmits bitmap data generated on the band memory 2027 via the GDI 2028 to the printer 100.

The feature of the image mode type is that drawing processing can be performed on high-resolution color image data and complicated graphic data at a high speed. On the other hand, even in case of drawing characters and/or simple figures, the image data in the entire drawing area is generated in the output resolution and output tonality and transmitted as a print command, therefore, when high-resolution/high tonality characters/graphics are printed at a high speed, the processing time is increased.

Hereinbelow, counterfeit judgment processing will be described about the PDL mode type processing system and the image mode type processing system in the printer driver 2020 as PDL driver 2023 and image driver 2024.

The PDL driver 2023 and the image driver 2024 have counterfeit judgment units 2025 and 2026 respectively, and perform the counterfeit judgment processing by detecting pre-embedded electronic watermark information from image data which satisfies a predetermined resolution condition among print information received from the DDI.

The print information includes three attributes, "text" indicative of font data, "graphics" indicative of figure vectors, gradation information or the like, and "image" indicative of read photographic image or the like, and different functions are called for the respective attributes. Further, as "image" attribute data includes information on the numbers of pixels in vertical and horizontal directions, the output image size and the like, it is easy to extract only data having the "image" attribute (hereinafter, simply referred to as "image data") satisfying the above resolution condition when print information has been received from the DDI and process the data.

Hereinbelow, the counterfeit judgment processing by the counterfeit judgment unit 2025 in the PDL driver 2023 will be described with reference to the flowchart of FIG. 3. Note that as the counterfeit judgment processing by the counterfeit judgment unit 2026 in the image driver 2024 is the same as that in the PDL driver 2023 except that bitmap data is generated on the printer driver 2020 side, the explanation of the processing by the counterfeit judgment unit 2026 will be omitted.

Figure 3:
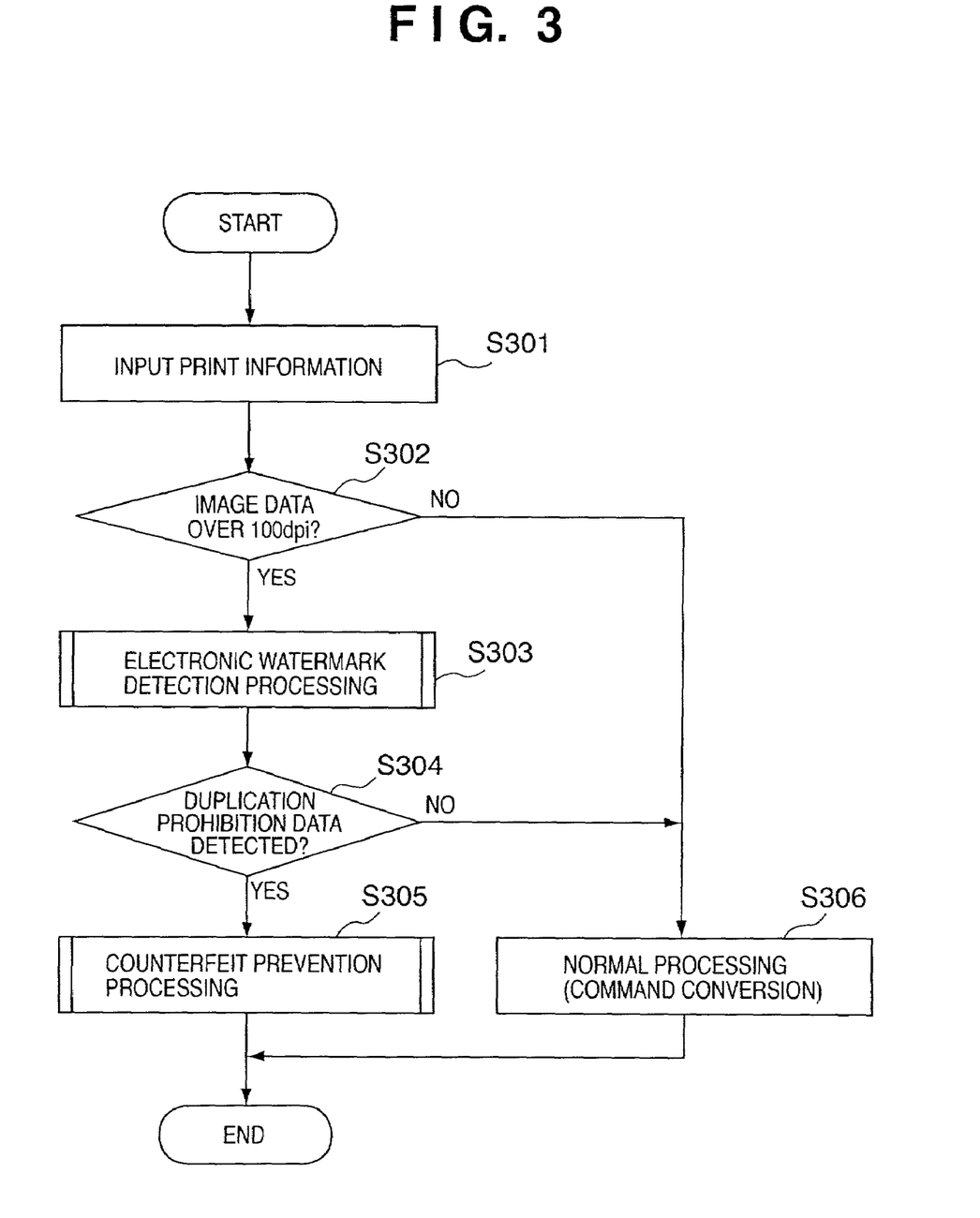
FIGS. 3 and 4 are flowchart showing counterfeit judgment processing.

In FIG. 3, first, at step S301, print information is inputted from the DDI. As the print information, image data obtained by reading an original by the scanner 300, image data pre-stored in a storage medium such as a hard disk (not shown) or the like, as well as image data generated by the application 201, may be inputted. Next, at step S302, it is determined whether or not the input print information represents image (image attribute image) and satisfies a predetermined resolution condition.

Generally, when a bank note or negotiable instrument is to be duplicated, an original image read by the scanner 300 or the like is to be reproduced with fidelity, image data to be processed has a resolution equal to or higher than a predetermined level. Accordingly, the resolution condition is set to a certain level at which sufficient precision cannot be obtained in a printed output as a counterfeit bank note or negotiable instrument. More specifically, if data resolution upon output is equal to or less than 100 dpi (dot/inch), it can be considered from the output image quality that the obtained output is insufficient as a counterfeit. Accordingly, there is a low probability that image data having resolution equal to or less than 100 dpi is counterfeit data. in the present embodiment, 100 dpi is set as the resolution condition.

At step S302, if it is determined that the input print information is image data having a resolution equal to or less than 100 dpi, the process proceeds to step S306, at which the PDL driver 2023 converts the print information into a PDL command as in normal processing, and the process ends.

On the other hand, if the input print information is image data having a resolution over 100 dpi, the process proceeds to step S303, at which electronic watermark detection processing is performed.

Hereinbelow, the electronic watermark detection processing at step S303 will be described. In the present embodiment, if particular electronic watermark information indicating duplication prohibition is detected from input image data having resolution over 100 dpi, it is determined that the image data is based on a particular original and there is a high probability that the print processing is made for the purpose of counterfeiting. Next, a method for extracting the electronic watermark information in the present embodiment will be described. Note that the present invention is not limited to this method but any other well-known extraction method can be employed.

First, the input image data is divided into blocks, and Fourier transform is performed on each block to extract a frequency component. The image data in obtained frequency area is separated into amplitude spectrum and phase spectrum, and a registration signal included in the amplitude spectrum is detected.

Generally, according to human visual perception characteristics, a signal embedded in a low frequency component is usually recognized as noise in comparison with a signal embedded in a high frequency component. Further, since irreversible compression such as JPEG processing has an effect similar to that of low-pass filter, the high frequency component is eliminated by JPEG compression/expansion processing.

The registration signal is embedded as an impulse signal to an intermediate frequency area with a level equal to or less than a first frequency level at which the signal is hardly recognized by human eye and equal to or higher than a second frequency level at which the signal is not eliminated by irreversible compression/expansion. Accordingly, the registration signal is detected by extracting an impulse signal included in the amplitude spectrum in a frequency area at the intermediate level.

Then the scaling factor of the digital image data is calculated based on coordinates of the extracted registration signal (impulse signal).

In the counterfeit judgment unit 2025, in the object image which has not been scaling-processed, a frequency component where the impulse signal is embedded is previously determined. Accordingly, the scaling factor is calculated by the ratio between this frequency and a frequency where the impulse signal has been detected.

For example, assuming that the previously-determined frequency is a, and the frequency where the impulse signal has been detected is b, it is determined that a/b scaling has been performed, which is characteristic of the Well-known Fourier transform.

Then, a pattern size to detect the electronic watermark information included in the image data is determined, and convolution using the pattern is performed, thereby the electronic watermark information can be detected.

As a result of the electronic watermark detection processing (S303) as described above, if electronic watermark information indicating duplication prohibition has not been detected (S304), the PDL driver 2023 performs normal PDL command conversion processing at step S306. Note that in this case, as the print information is image data, predetermined header information is added to the image data, and the data is converted into the print command.

On the other hand, if electronic watermark information indicative of duplication prohibition has been detected at step S304, the PDL driver 2023 performs counterfeit prevention processing at step S305.

Hereinbelow, the counterfeit prevention processing in the present embodiment will be described with reference to the flowchart of FIG. 4.

First, at step S401, the PDL driver 2023 notifies the OS that the duplication prohibition data is included in the input data. In response to the notification, the OS side displays a warning dialog as shown in FIG. 5 for a user to notify that there is a possibility that the current print processing is made as counterfeiting, i.e., a crime.

Next, at step S402, if the user has selected "NO" (=stop printing) in response to the warning dialog, the PDL driver 2023 stops the printing operation based on the data, and the process ends.

On the other hand, if the user has selected "Yes" (=continue printing) in response to the warning dialog, the operation history is stored in a hard disk device (not shown) or the like in the host computer 200, and processing to fill the image with black color or the like is performed as counterfeit prevention (S403), and the routine of the counterfeit prevention processing (S305) ends. Note that the above image filling is merely an example of the counterfeit prevention processing. Any other processing may be used as long as it degrades image quality of image data, i.e., it disturbs reproduction of input image with fidelity.

If the print operation has not been stopped, the print information outputted from the PDL driver 2023 is inputted into the printer 100 in FIG. 1 via a host I/F 111.

The printer 100 is divided into a formatter controller 110 which interprets the print information inputted from the host computer 200 and generates a print image (bitmap image data), and at the same time, controls the overall printer 100, and a printer engine 140 which receives the print image and forms a visible image on a print sheet.

The formatter controller 110 is connected to an operation panel 120 having switches and LED display device and the like for the user's operation and for notifying the user of printer statuses. The operation panel 120 is provided as a part of exterior components of the printer 100.

Figure 6:
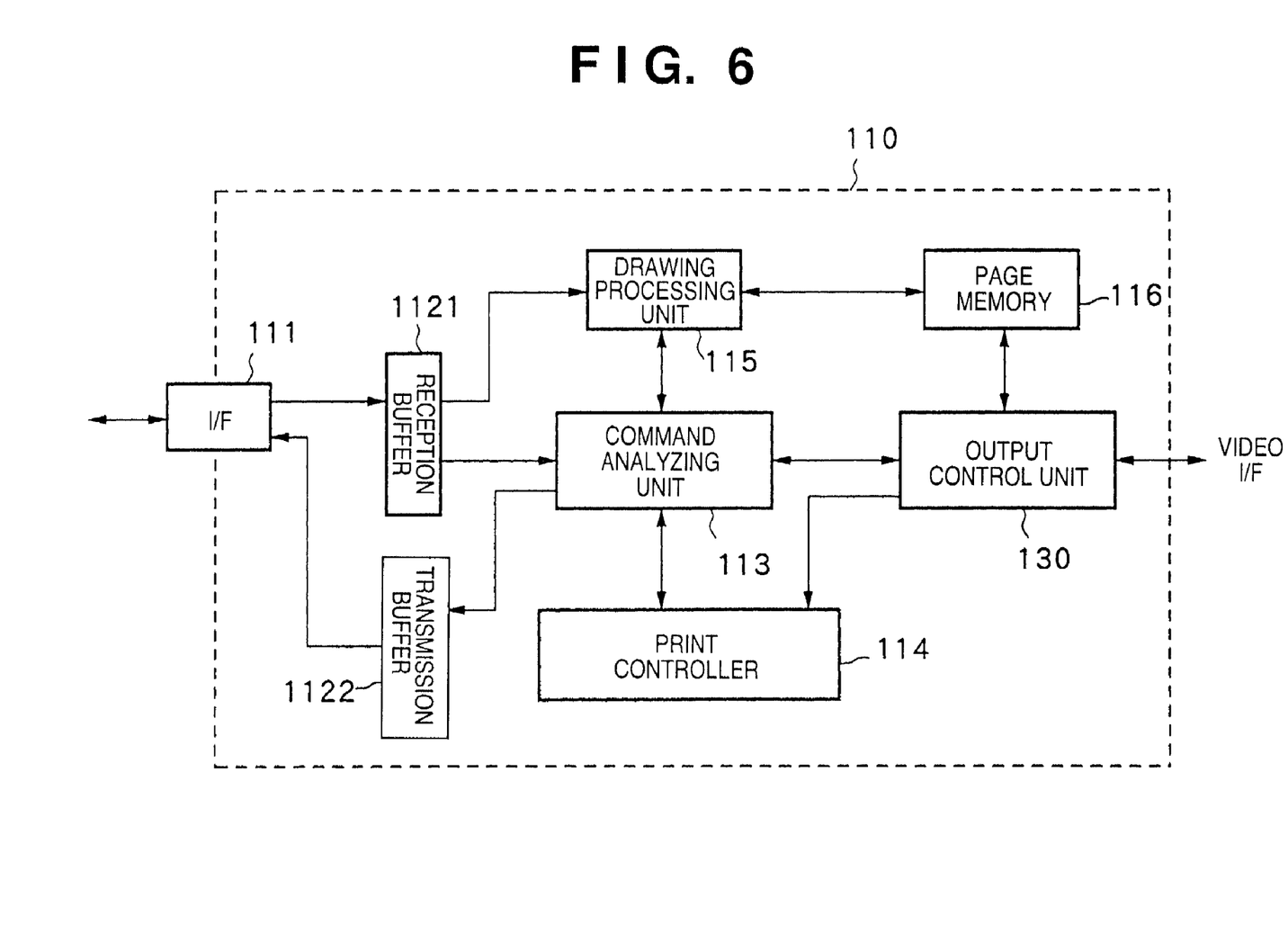
FIG. 6 is a block diagram showing the construction of formatter controller.

Hereinbelow, the formatter controller 110 in the printer 100 will be described with reference to FIG. 6.

The formatter controller 110 is a part generally referred to as a PDL controller or the like. The formatter controller 110 has the host interface (I/F) 111 as connection means for connection with the host computer 200, a reception buffer 1121 as storage means for temporarily storing and managing reception data and the like from the host computer 200, a transmission buffer 1122 as storage means for temporarily storing and managing transmission data and the like to the host computer 200, a command interpreter 113 which interprets print data, a print controller 114, a drawing processor 115, a page memory 116, an output controller 130 and the like.

The host interface 111 which is communication means for transmission/reception of print data with the host computer 200 enables communication in conformance with the IEEE-1284 protocol. Note that the present invention is not limited to this communication protocol, but connection by various protocols may be performed via the network. Further, the interface 111 may be communication means in conformance with IEEE-1394 protocol, USB communication protocol or the like.

The print data received via the host interface 111 is sequentially stored in the reception buffer 112, and read and processed by the command interpreter 113 or the drawing processor 115 in accordance with necessity.

The command interpreter 113 comprises a control program in conformance with the PDL command system and print job control languages. The command interpreter 113 provides instructions to the drawing processor 115 based on the result of interpretation of the print data regarding character printing, figure and image drawing, and provides instructions to the print controller 114 regarding commands for paper selection, reset and the like other than drawing commands.

The drawing processor 115 has a function as a renderer of sequentially mapping the respective drawing objects of characters and images on the page memory 116. The output controller 130 converts the content in the page memory 116 into a video signal VDO, and transfers the video signal VDO via a video I/F 150 to the printer engine 140.

The printer engine 140 is a printing mechanism to form a permanent visible image on a print sheet based on the received video signal. Hereinbelow, the operation of the printer engine 140 will be described with reference to FIG. 7 showing the construction of the printer engine 140.

Figure 7:
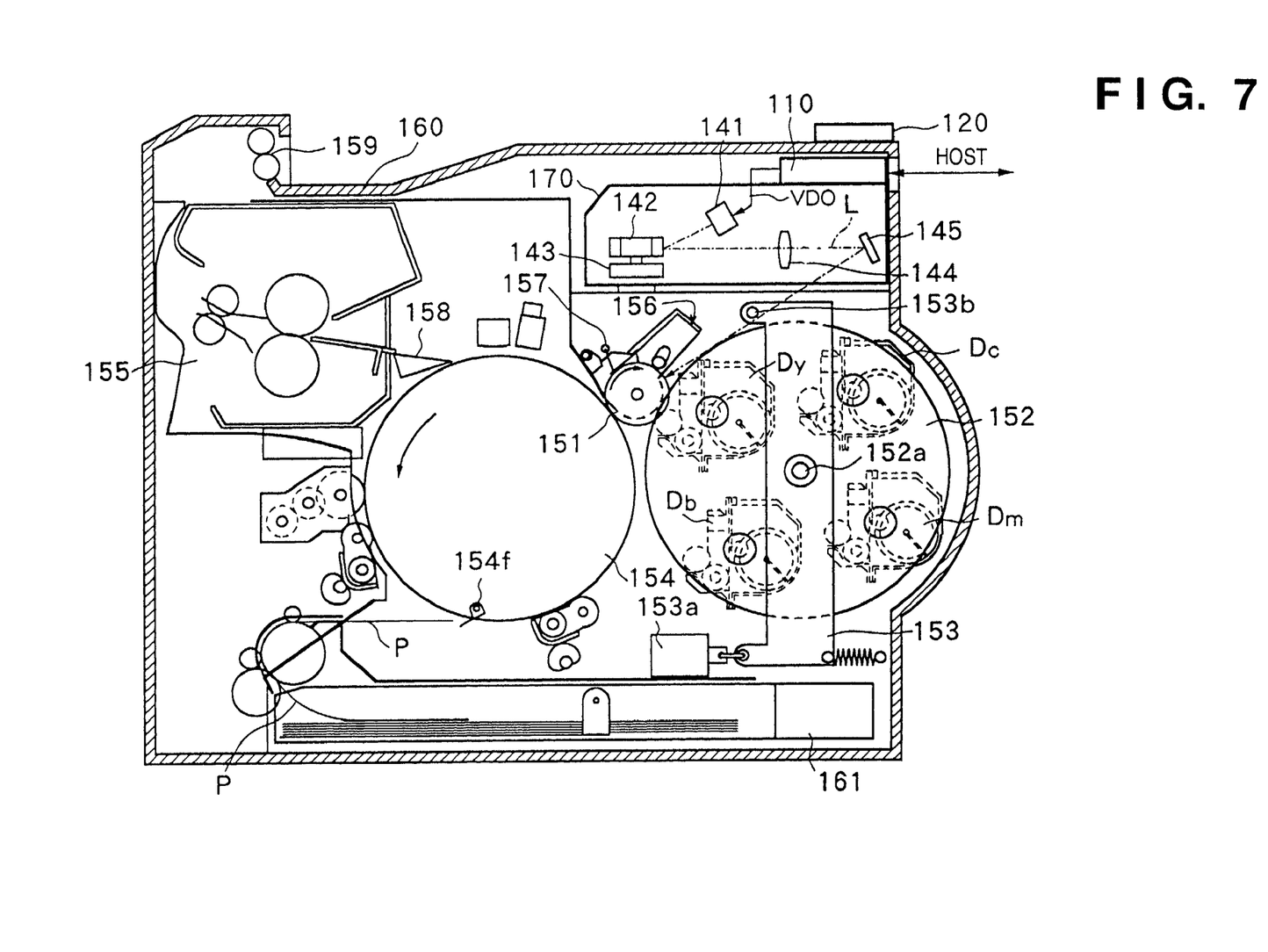
FIG. 7 is a cross-sectional view of printer engine.

In FIG. 7, one end of print sheet P supplied from a paper cassette 161 is held by a gripper 154f, and held on the outer periphery of transfer drum 154. Respective color latent images formed by an optical unit 170 on an electrostatic drum 151 are developed by respective developers Dy, Dm, Dc and Db for yellow (Y), magenta (M), cyan (C) and black (B) colors, then transferred plural times onto the print sheet on the periphery of the transfer drum, thus a multi-color image is formed. Thereafter, the print sheet P is separated from the transfer drum 154, then the image is fixed onto the print sheet by a fixing unit 155, and the print sheet P is discharged from a paper discharging unit 159 onto a paper discharge tray 160.

The developers for colors, Dy, Dm, Dc and Db respectively have a rotation shaft on both ends. The developers are held by a developer selection mechanism 152 such that they are rotatable on the shafts. In this arrangement, as shown in FIG. 7, the positions of the respective developers Dy, Dm, Dc and Db can be maintained constant even when the developer selection mechanism 152 rotates on its rotation shaft 152a.

In the developer selection mechanism 152 integrated with the developers, when a selected developer has been moved to a developing position, a selection mechanism holding frame 153 is drawn toward the electrostatic drum 151 by a solenoid 153a, with a support 153b as the center, thus the developer selection mechanism 152 is moved toward the electrostatic drum 151, and developing processing is performed.

Next, the electrostatic drum 151 is uniformly charged to a predetermined polarity by a charger 156. The image data VDO mapped as a print image by the formatter controller 110 is converted into a video signal of corresponding pattern, and outputted to a laser driver to drive a semiconductor laser 141.

A laser beam emitted from the semiconductor laser 141 is on/off controlled in accordance with the input image data (video signal) VDO, further, the laser beam is swayed in left and right directions by a polygon mirror rotated at a high speed by a scanner motor 143, to scan-expose the electrostatic drum 151 via a polygon lens 134 and a reflection mirror 144. Thus a latent image of the image pattern is formed on the electrostatic drum 151.

Next, for example, an M (magenta) color electrostatic latent image is developed by the M (magenta) developer Dm, then a first toner image in M (magenta) color is formed on the electrostatic drum 151.

On the other hand, the print sheet P is fed at predetermined timing, and a transfer bias voltage of an opposite polarity to that of the toner (e.g., plus polarity) is applied to the transfer drum 154. Then the first toner image on the electrostatic drum 151 is transferred onto the print sheet P, and at the same time, the print sheet P is electrostatically attracted to the surface of the transfer drum 154. Thereafter, the residual M (magenta) color toner is removed by a cleaner 157 from the electrostatic drum 151, in preparation for the latent image formation and development for the next color.

Then, the second toner image of C (cyan) color, then the third toner image of Y (yellow) color, and the fourth toner image of Bk (black) color are transferred in similar procedures. Note that upon transfer of each color image, a bias voltage higher than the previous transfer is applied to the transfer drum 154.

When the front end of the print sheet P where the four color toner images are overlap-transferred approaches a separation position, a separation claw 158 comes into contact with the surface of the transfer drum 154, to separate the print sheet P from the transfer drum 154. The print sheet P is conveyed to the fixing unit 155, then the toner images on the print sheet are fixed to the print sheet, and the print sheet is discharged on the paper discharge tray 160. The printer engine 140 of the present embodiment enables image output up to 600 dot/inch (dpi) resolution through the above image formation process.

As described above, according to the present embodiment, in the printer driver 2020, the electronic watermark detection processing is performed only on image data having a resolution over a predetermined resolution. Since the execution of electronic watermark detection processing can be minimized, the counterfeit prevention function against counterfeiting bank notes, negotiable instruments and the like can be realized while suppressing reduction of total throughput.

Further, in the present embodiment, the resolution as a criterion as to whether or not the electronic watermark detection processing is performed, i.e., whether or not the counterfeit judgment processing is performed, is 100 dpi. Generally, the resolution of data frequently transferred on the Internet or the like for image print-output is equal to or less than 100 dpi. Accordingly, to skip the counterfeit judgment processing for image data having a resolution equal to or less than 100 dpi is effective in reduction of processing time. Note that in use of another resolution as the criterion of counterfeit judgment processing, there is no change in subject matter of the present invention.

<Modification to First Embodiment>

In the above-described embodiment, the counterfeit judgment processing is performed in accordance with whether an output resolution is over a predetermined value, however, in addition to the output resolution, an output image size may be added to the criterion.

For example, if the size of output image is small even though the output resolution is high, the printed output based on the image data is not used as a counterfeit. Accordingly, the counterfeit judgment processing can be skipped if the output image size is less than a predetermined value (e.g., within 5 cm×5 cm).

In this manner, the counterfeit judgment processing is performed only if image data has a size equal to or greater than a predetermined size, in addition to a resolution equal to or higher than a predetermined resolution, thereby processing time can be further reduced.

Second Embodiment

Hereinbelow, a second embodiment of the present invention will be described. Since the second embodiment is executed in a similar system to that in the first embodiment, constituent elements corresponding to those in the first embodiment have the same reference numerals and the detailed explanations of the elements will be omitted.

In the above-described first embodiment, the electronic watermark detection processing is performed only on image data representing image and having a resolution higher than a predetermined resolution. In the second embodiment, the electronic watermark detection processing is performed on image data representing image without any condition.

As in the case of the first embodiment, print information inputted from the DDI has three attributes, "text" indicative of font information, "graphics" indicative of figure vector, gradation information and the like, and "image" indicative of read photographic image or the like, and different functions are called for the respective attributes. Accordingly, it is easy to extract only the "image" attribute data upon reception of print information from the DDI and process the extracted data.

It can be considered that generally, in a case where a bank note, a negotiable instrument or the like is to be duplicated, in order to reproduce an original image read by the scanner 300 or the like with fidelity, image data as the object of processing is inputted as "image" attribute data. In the second embodiment, it can be considered that if the counterfeit judgment processing is performed only on input image data, counterfeit prevention can be sufficiently realized.

Figure 8:
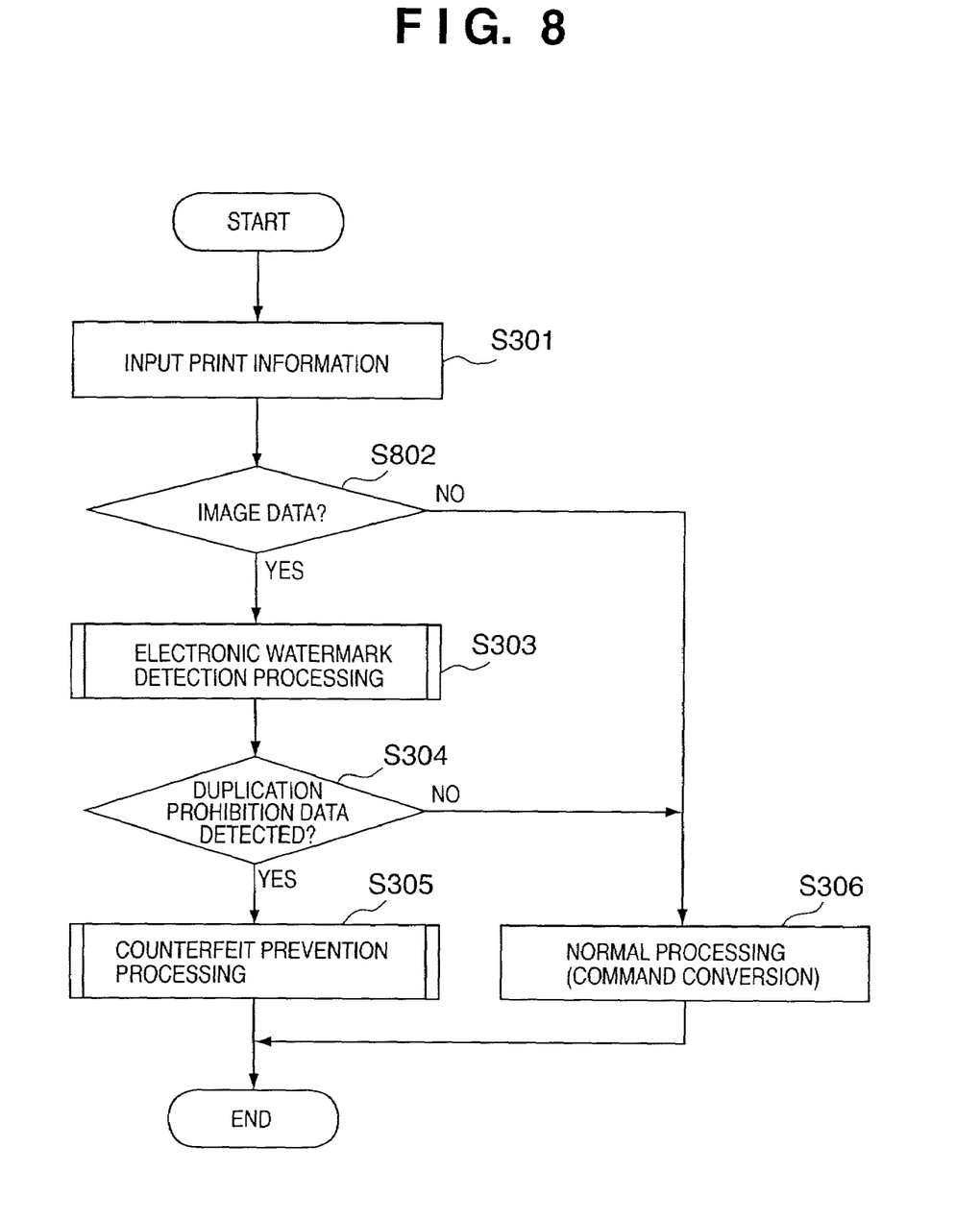
FIG. 8 is a flowchart showing the counterfeit judgment processing according to a second embodiment of the present invention.

Next, the counterfeit judgment processing in the second embodiment will be described with reference to the flowchart of FIG. 8. In FIG. 8, process steps corresponding to those in FIG. 3 described in the first embodiment have the same step numbers, and the detailed descriptions of the steps will be omitted. Note that the counterfeit judgment processing is performed in the counterfeit judgment unit 2025 in the PDL driver 2023 or in the counterfeit judgment unit 2026 in the image driver 2024, in the printer driver 2020.

In FIG. 8, at step S802, it is determined whether or not the input print information is image data. If the input information is image data, the process proceeds to step S303 at which the electronic watermark detection processing is performed, while if the input information is not image data, the process proceeds to step S306, at which normal print processing is performed.

Figure 4:
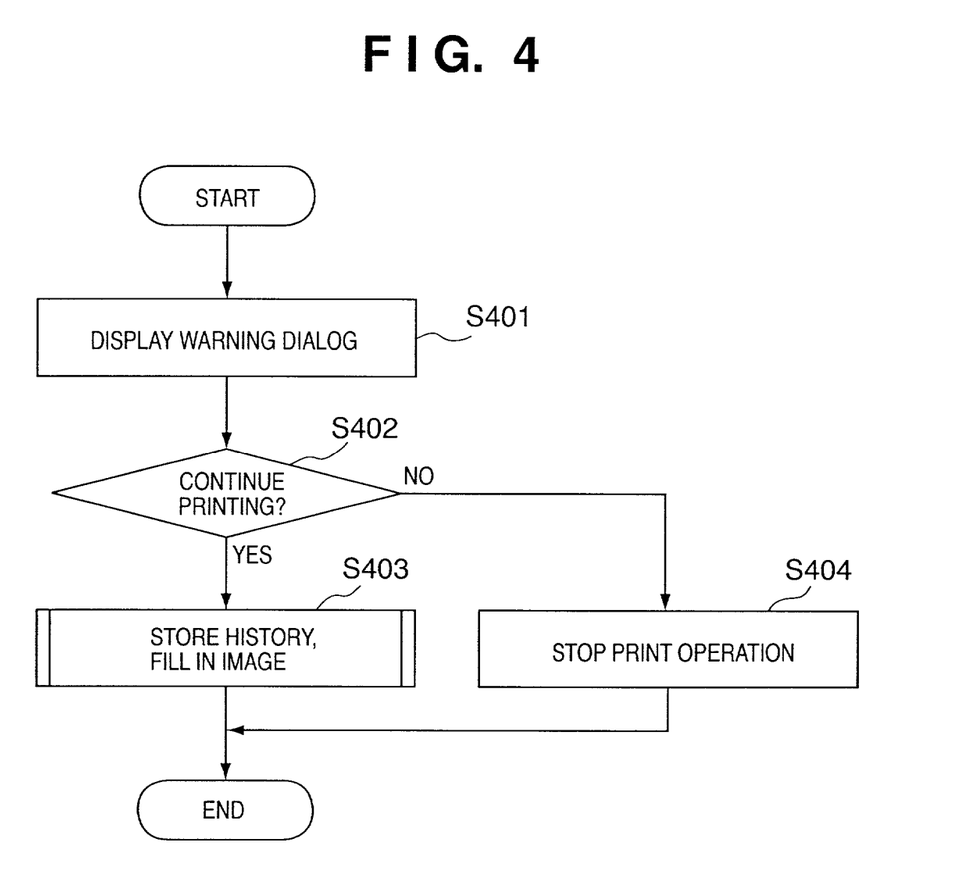
Figure 5:
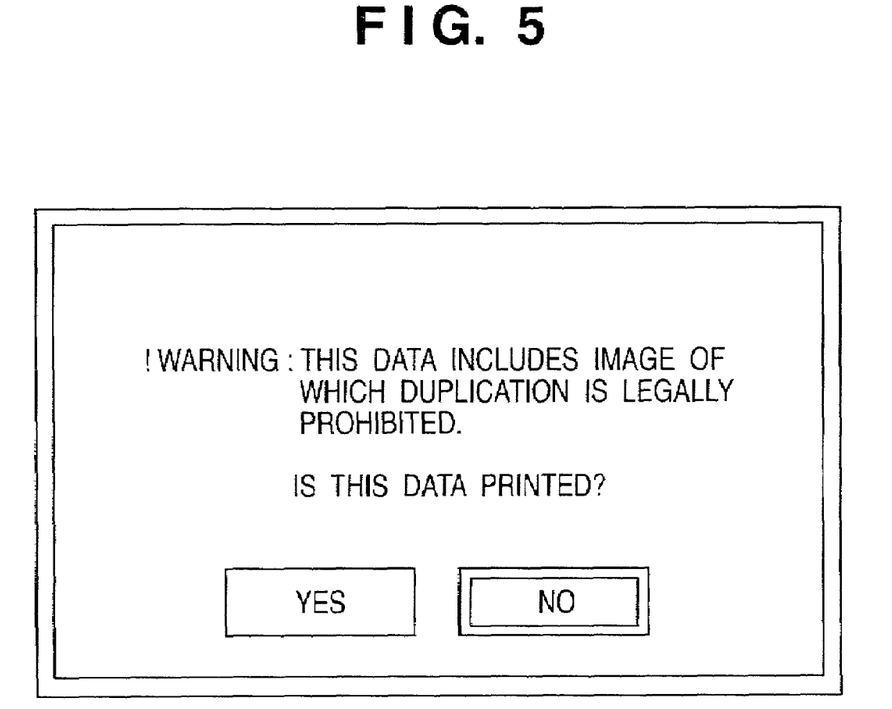
FIG. 5 is an example of warning dialog to a user.

Note that the counterfeit prevention processing in the second embodiment is the same as that as shown in FIG. 4 in the first embodiment.

As described above, according to the second embodiment, the electronic watermark detection processing is performed only on image attribute data in the printer driver 2020. By this arrangement, as the execution of the electronic watermark detection processing can be minimized, the counterfeit prevention function against counterfeiting bank notes, negotiable instruments and the like can be realized while preventing reduction of total throughput.

<Modification to Second Embodiment>

In the second embodiment, the counterfeit judgment processing is performed in accordance with whether or not input data is image data, however, the judgment reference can be further limited.

Figure 9:
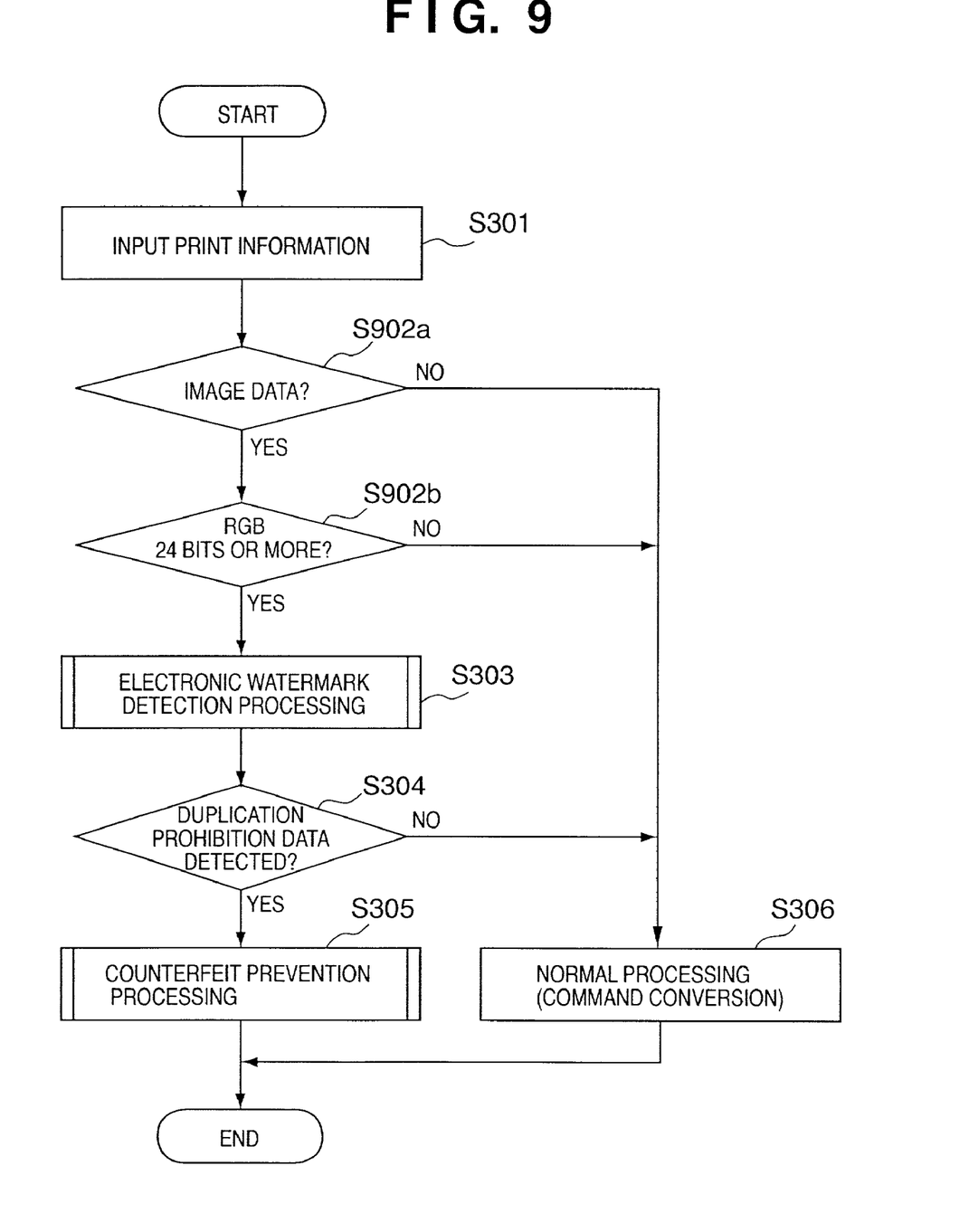
FIG. 9 is a flowchart showing a modification to the second embodiment.

FIG. 9 shows a flowchart of the counterfeit judgment processing in the counterfeit judgment unit 2026 in the PDL driver 2023 according to the present modification. The flowchart of FIG. 9 is different from the flowchart of FIG. 3 in that the determination as to whether or not the electronic watermark detection processing is performed is made at two steps S902a and S902b. That is, if it is determined at step S902a that the input data is image data, the amount of information per pixel (the number of bits) is checked at step S902b. Only if the amount of information is equal to or greater than that of respectively 8-bit RGB data, 24 bits, the process proceeds to step S303 to perform the electronic watermark detection processing.

Generally, even in case of image data, if the number of representable colors is small, i.e., the image data is indicative of monochrome image, 16-color image, 256-color image or the like, the probability of image data for counterfeiting is very low. Accordingly, the counterfeit judgment processing is omitted regarding image data with small number of representable colors, i.e., small amount of information, thereby processing time can be further reduced.

Note that in the above-described first and second embodiments and the modifications, the present invention is applied to a color laser-beam printer, however, the printer to which the present invention is applicable is not limited to the color laser-beam printer, but the invention is applicable to other color printers such as an ink-jet printer and a thermal printer to form an image on a print medium based on other printing methods.

Further, the criteria of judgment for execution of the counterfeit judgment processing is not limited to the above-described image data resolution, the image size, the image attribute or the information amount. Any other judgment reference can be employed as long as it can be used for judging whether or not input image data is in high quality for obtaining a printed output as a counterfeit.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for realizing the functions of the above-described embodiments to a system or an apparatus, reading the program code with a computer (e.g., CPU, MPU) of the system or apparatus from the storage medium, then executing the program. In this case, the program code read from the storage medium realizes the functions according to the embodiments, and the storage medium storing the program code constitutes the invention. Furthermore, besides aforesaid functions according to the above embodiments are realized by executing the program code which is read by a computer, the present invention includes a case where an OS (operating system) or the like working on the computer performs a part or entire actual processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire actual process in accordance with designations of the program code and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A control method for an image forming system where an image processing apparatus for generating image data is connected to an image forming apparatus for forming a visible image based on the image data on a print medium, in said image processing apparatus, said method comprising:

an input step of inputting print information, wherein the print information includes attribute information;

an object image judgment step of judging whether or not image data indicated by the input print information has a resolution equal to or higher than a predetermined resolution and whether or not the attribute information indicates that the input print information represents an image;

a particular image judgment step of, if it is judged at said object image judgment step that said image data has a resolution equal to or higher than the predetermined resolution and said attribute information indicates an image, judging whether or not said image data represents a particular image, and, if it is judged at said object image judgment step either that said image data has a resolution less than the predetermined resolution or that said attribute information does not indicate an image, not judging whether or not said image data represents the particular image; and a particular image processing step of, if it is judged at said particular image judgment step that said image represents the particular image, performing predetermined processing.

2. The method according to claim 1, wherein said predetermined resolution is a resolution with which image data can obtain sufficient precision as said particular image.

3. The method according to claim 2, wherein at said object image judgment step, if said image data has the resolution equal to or higher than the predetermined resolution and represents an image, and said image data has an image size equal to or greater than a predetermined size, it is judged that said image data is in high quality.

4. The method according to claim 3, wherein said predetermined size is a size with which image data can represent an image as said particular image.

5. The method according to claim 1, wherein at said object image judgment step, if said image data represents an image, it is judged that said image data is in high quality.

6. The method according to claim 5, wherein at said object image judgment step, if said image data has a data amount equal to or greater than a predetermined amount, it is judged that said image data is in high quality.

7. The method according to claim 6, wherein said predetermined amount is a data amount enabling representation of predetermined number of colors.

8. The method according to claim 1, wherein said object image judgment step, said particular image judgment step and said particular image processing step are performed in a driver for said image forming apparatus in said image processing apparatus.

9. The method according to claim 1, wherein at said input step, a print command from an application program is inputted.

10. The method according to claim 9, wherein said print command is described in Page Description Language.

11. The method according to claim 1, wherein at said particular image judgment step, if said image data includes particular information, it is judged that said image data represents a particular image.

12. The method according to claim 11, wherein said particular information is electronic watermark information embedded in said image data.

13. The method according to claim 1, wherein at said particular image processing step, a warning message is displayed for a user.

14. The method according to claim 1, wherein at said particular image processing step, image processing to degrade image quality is performed on said image data.

15. The method according to claim 1, wherein at said particular image processing step, said image data is filled with a predetermined color.

16. The method according to claim 1, wherein at said particular image processing step, an operation history of said image data is stored.

17. An image forming system where an image processing apparatus for generating image data is connected to an image forming apparatus for forming a visible image based on the image data on a print medium, wherein a driver for said image forming apparatus in said image processing apparatus persons:

a first judgment as to whether or not image data indicated by input print information including attribute information has a resolution equal to or higher than a predetermined resolution and whether or not the attribute information indicates that the input print information represents an image;

a second judgment as to whether or not said image data represents a particular image if it is judged that said image data has a resolution equal to or higher than the predetermined resolution and said attribute information indicates represents an image; and predetermined processing on said image data, if it is judged that said image data represents the particular image, wherein the driver does not perform said second judgment as to whether or not said image data represents a particular image if it is judged at said first judgment either that said image data has a resolution less than the predetermined resolution or that said attribute information does not indicate an image.

18. A recording medium where a program for controlling an image processing apparatus for generating image data for printing is recorded, wherein said program includes:

code for an input process for inputting print information, wherein the print information includes attribute information;

code for an object image judgment process for judging whether or not image data indicated by the input print information has a resolution equal to or higher than a predetermined resolution and whether or not the attribute information indicates that the input print information represents an image;

code for a particular image judgment process for, if it is judged at said object image judgment process that said image data has a resolution equal to or higher than the predetermined resolution and said attribute information indicates an image, judging whether or not said image data represents a particular image, and if it is judged at said object image judgment process either that said image data has a resolution less than the predetermined resolution or that said attribute information does not indicate an image, not judging whether or not said image data represents a particular image; and code for a particular image processing process for, if it is judged at said particular image judgment process that said image data represents the particular image, performing predetermined processing.

* * * * *

UNITED STATES PATENT AND TRADEMARK OFFICE
CERTIFICATE OF CORRECTION

PATENT NO. : 7,193,744 B2 Page 1 of 1
APPLICATION NO. : 09/768330
DATED : March 20, 2007
INVENTOR(S) : Atushi Kashihara It is certified that error appears in the above-identified patent and that said Letters Patent is hereby corrected as shown below:

Col. 1, line 25, "operate" should read --operates--.

Col. 2, line 31, "flowchart" should read --flowcharts--.

Col. 4, line 47, "in" should read --In--.

Col. 5, line 40, "Well-known" should read --well-known--.

Col. 7, line 16, "(B) colors," should read --(Bk) colors,--.

Col. 12, line 15, "persons:" should read --performs:--.

Col. 12, line 26, "represents" should be deleted.

Signed and Sealed this

Eleventh Day of December, 2007

JON W. DUDAS
*Director of the United States Patent and Trademark Office*